(12) United States Patent
Crossgrove et al.

(10) Patent No.: US 12,296,884 B2
(45) Date of Patent: May 13, 2025

(54) MULTI-PURPOSE STROLLER ADAPTER SUITABLE FOR VARIOUS CARRIER TYPES AND ACCESSORIES

(71) Applicant: Evenflo Company, Inc., Miamisburg, OH (US)

(72) Inventors: Jeremy Levinson Crossgrove, Revere, MA (US); Michelle M. J. Wood, Rehoboth, MA (US); Raymond Allen Boissonneault, Upton, MA (US); Kelly J Chamberlin, North Attleboro, MA (US); Brian Patrick Whitt, Kettering, OH (US)

(73) Assignee: Evenflo Company, Inc., Miamisburg, OH (US)

( * ) Notice: Subject to any disclaimer, the term of this patent is extended or adjusted under 35 U.S.C. 154(b) by 357 days.

(21) Appl. No.: 17/826,576

(22) Filed: May 27, 2022

(65) Prior Publication Data
US 2023/0382446 A1 Nov. 30, 2023

(51) Int. Cl.
*B62B 9/10* (2006.01)
*A47D 13/02* (2006.01)
*B60N 2/28* (2006.01)

(52) U.S. Cl.
CPC ............ *B62B 9/102* (2013.01); *A47D 13/025* (2013.01); *B60N 2/2848* (2013.01)

(58) Field of Classification Search
CPC ......... B62B 9/102; B62B 7/145; B62B 7/142; A47D 13/025; B60N 2/2848; B60N 2/2842; B60N 2/2845
See application file for complete search history.

(56) References Cited

U.S. PATENT DOCUMENTS 5,028,061 A * 7/1991 Hawkes ................. B62B 7/145
280/47.4
5,794,951 A 8/1998 Corley et al.
(Continued)

FOREIGN PATENT DOCUMENTS

DE 102007045068 B3 * 4/2009 ............. B62B 7/062
EP 2272734 A2 * 1/2011 ............... B62B 7/14
(Continued)

OTHER PUBLICATIONS

"Contours Maxi Cosi/Nuna Infant Car Seat Adapter", Supreme Stroller.com, Retrieved from Internet URL: https://www.supremestroller.com/products/contours-maxi-cosi-nuna-infant-car-seat-adapter, accessed on Dec. 10, 2021, pp. 3.
(Continued)

*Primary Examiner* — James A Shriver, II
*Assistant Examiner* — Michael T. Walsh
(74) *Attorney, Agent, or Firm* — Shook, Hardy & Bacon L.L.P.

(57) ABSTRACT

This description is related to an adapter that can be coupled to a stroller frame (e.g., to one side of the stroller frame) or other child product and that is changeable between a first configuration for supporting a first type of accessory (e.g., stroller accessory) and a second configuration for supporting a second type of accessory. The adapter can include a hub that is rotatable relative to the stroller frame or child product and can include a first connector and a second connector positioned at different locations relative to the hub. In examples, when the hub is rotated to a first position, the first connector can be in position to support the first type of accessory, and when the hub is rotated to the second position, the second connector can be in position to support the second type of accessory.

20 Claims, 7 Drawing Sheets

(56) References Cited

U.S. PATENT DOCUMENTS

| | | |
|---|---|---|
| 6,286,844 B1 | 9/2001 | Cone, II et al. |
| 6,331,032 B1 | 12/2001 | Haut et al. |
| 7,370,913 B2 | 5/2008 | Takamizu et al. |
| 7,938,435 B2 | 5/2011 | Sousa et al. |
| 8,465,045 B2 | 6/2013 | Lai |
| 8,651,502 B2 | 2/2014 | Winterhalter et al. |
| 8,851,505 B2 | 10/2014 | Van Gelderen et al. |
| 9,010,773 B2 | 4/2015 | Horst et al. |
| 9,108,659 B2 * | 8/2015 | Sparling ............... B62B 7/142 |
| 9,216,670 B2 | 12/2015 | Heisey |
| 9,221,487 B2 | 12/2015 | Doucette et al. |
| 9,545,940 B2 * | 1/2017 | Taylor .................. B62B 7/142 |
| 9,821,831 B2 | 11/2017 | Reaves et al. |
| 9,884,640 B2 | 2/2018 | Li |
| 10,023,218 B2 * | 7/2018 | Paxton ................. B62B 7/142 |
| 10,442,453 B2 * | 10/2019 | Haut ..................... B62B 7/062 |
| 10,479,391 B2 * | 11/2019 | Haut ..................... B62B 7/10 |
| 2009/0127827 A1 | 5/2009 | Pike et al. |
| 2015/0183450 A1 | 7/2015 | Chen |
| 2021/0101633 A1 | 4/2021 | Eggert-Crowe et al. |
| 2022/0234640 A1 * | 7/2022 | Fu ........................ B62B 7/145 |

FOREIGN PATENT DOCUMENTS

| | | |
|---|---|---|
| WO | 2014/001776 A2 | 1/2014 |
| WO | 2015/093999 A1 | 6/2015 |
| WO | 2021/048384 A1 | 3/2021 |
| WO | 2021/185700 A1 | 9/2021 |

OTHER PUBLICATIONS

"Thule Maxi-Cosi Infant Car Seat Adapter—Glide/Urban Glide—Black", Retrieved from Internet URL: https://www.target.com/p/thule-maxi-cosi-infant-car-seat-adapter-glide-urban-glide-black/-/A-75572258#Ink=sametab, accessed on Dec. 10, 2021, pp. 3.

Jeep, "Delta Children Infant Car Seat Adapter for Jeep Gemini Stroller", Retrieved from Internet URL: https://www.kohls.com/product/prd-5290792/delta-children-infant-car-seat-adapter-for-jeep-gemini-stroller.jsp?, accessed on Dec. 10, 2021, p. 1.

* cited by examiner

MULTI-PURPOSE STROLLER ADAPTER SUITABLE FOR VARIOUS CARRIER TYPES AND ACCESSORIES

BACKGROUND

Stroller frames can be used to transport various types of infant, toddler, and child carriers and accessories. In some instances, different carrier types (e.g., infant carrier and toddler seat) and/or accessories (e.g., tray, bumper bar, etc.) can be interchangeably used with a same stroller frame. For example, in one configuration, the stroller frame can support a first type of carrier (e.g., infant car seat), and in an alternative configuration, the stroller frame can support a second type of carrier (e.g., toddler seat). Among other things, a common stroller frame that supports different carrier types can reduce costs and waste and can provide a more efficient system with fewer single-use products needing separate storage, maintenance, etc.

DETAILED DESCRIPTION OF DRAWINGS

The present systems and methods for a multi-purpose stroller adapter are described in detail below with reference to these figures.

DETAILED DESCRIPTION

Figure 1:
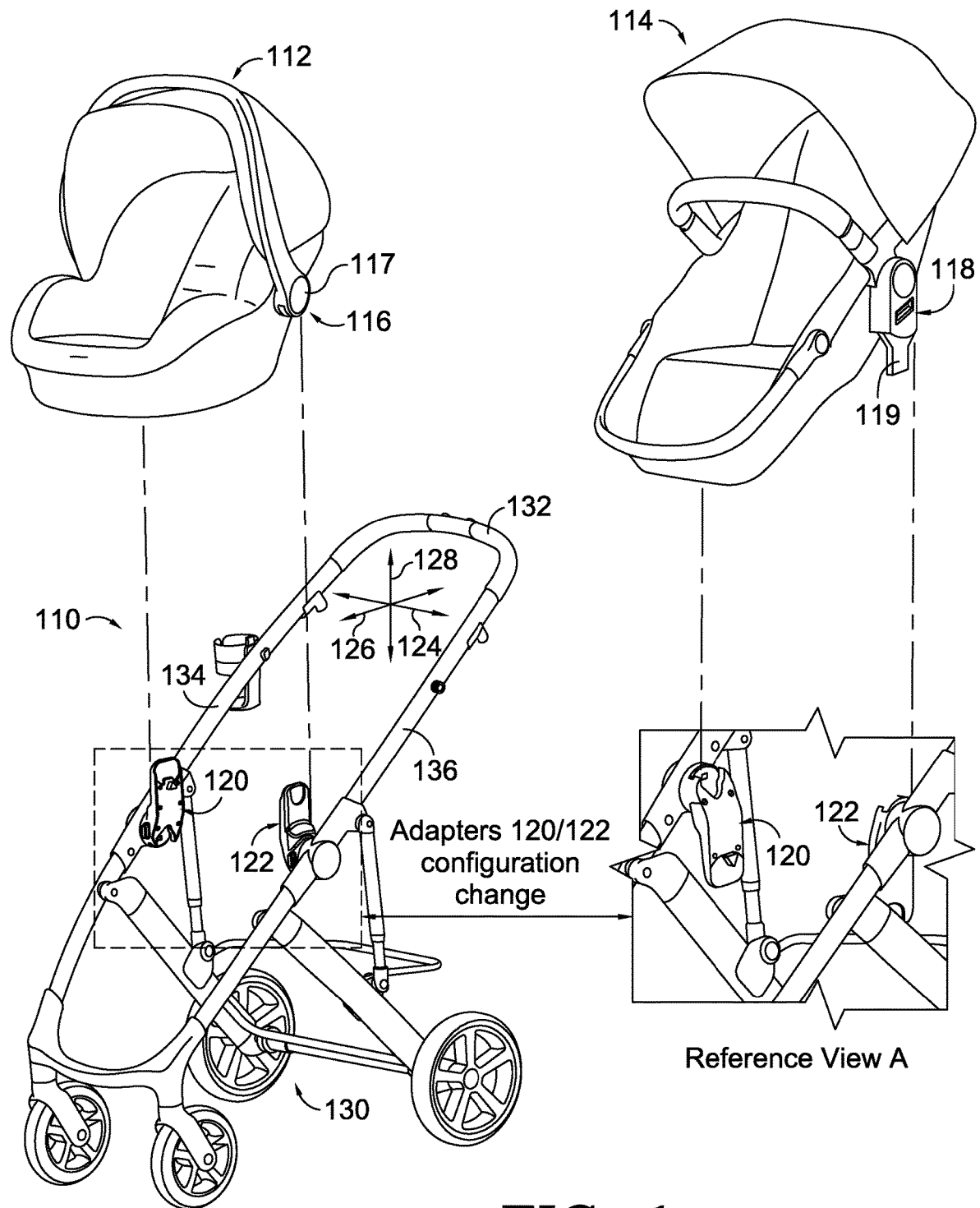
FIG. 1 depicts a stroller with an adapter in a first position, as well as a reference view showing the adapter in a second position, in accordance with an example.

This detailed description is related to an adapter that can be coupled to a stroller frame (e.g., to one side of the stroller frame) and that is changeable between a first configuration for supporting a first type of stroller accessory (e.g., infant car seat) and a second configuration for supporting a second type of stroller accessory (e.g., toddler seat, tray or bumper bar, etc.). For example, the adapter can include a hub that is rotatable relative to the stroller frame and can include a first connector and a second connector positioned at different locations relative to the hub. In examples, when the hub is rotated to a first position, the first connector can be in position to support the first type of stroller accessory, and when the hub is rotated to the second position, the second connector can be in position to support the second type of stroller accessory. In at least some examples, both the first connector and the second connector are fixed relative to the hub and relative to each other. As such, when the hub is rotated to the first position, the first connector is rotated into a use position while the second connector is simultaneously rotated to a non-use position. And vice versa, when the hub is rotated to the second position, the first connector is rotated into a non-use position while the second connector is simultaneously rotated to a use position. Some examples described in this specification relate to a stroller, and in other examples, the adapter(s) can be used with other types of structures (e.g., basinet frame, crib frame, etc.).

Having generally described some examples, some more specific details are now provided. A child caregiver can sometimes have multiple carrier types for children at different stages of development, such as when the caregiver is providing care to two or more children needing different seat types or when a child transitions from one carrier type to another. For example, a child caregiver can have a carry cot and/or infant car seat (ICS) (e.g., for infants or smaller children), as well as a toddler seat (e.g., for larger children). As such, as opposed to needing different stroller frames for each carrier type, it can be useful for a stroller frame to support multiple carrier types to reduce financial costs sometimes associated with having to purchase multiple stroller frames and to reduce the number of items a caregiver might be responsible for maintaining, storing, transporting, etc.

Often, a child carrier includes one or more connectors for securement to one or more different types of support devices. For example, an infant car seat can include one or more connectors (e.g., one on each side) for securement to one or more of a car-seat base, swing, stationary base, stroller frame, and the like; and similarly, a carry cot or an infant seat can include one or more connectors for securement to one or more of these support devices. In some instances, a first connector on a first carrier type (e.g., ICS) can be different from a second connector on a second carrier type (e.g. carry cot or infant seat). For example, the first and second connectors can include different connector structures (e.g., male/female, rail/slot, latch/catch, etc.), different relative positions (e.g., different in an x, y, or z reference orientation), or other differences. As such, examples of the present disclosure include an adapter than can connect to and support carriers having different connector types. That is, the adapter can include features that operate to connect to different connector types, which in turn, can enable a stroller frame to connect to different connector types.

As indicated above, in examples of the present disclosure, an adapter for a stroller frame (e.g., one adapter coupled to one side of the stroller frame and a mirroring adapter coupled to the opposing side of the stroller frame) can include a hub that is rotatable relative to the stroller frame and can include a first connector and a second connector positioned at different locations relative to the hub. In examples, the first connector can include one or more features for mating with a connector of a first carrier type, and the second connector can include one or more features for mating with a connector of a second carrier type. In some examples, when the hub is moved to a first position, the first connector can be in position to support the first carrier type (e.g., ICS), and when the hub is rotated to the second position, the second connector can be in position to support the second carrier type (e.g., carry cot or toddler seat). As mentioned, in at least some examples, both the first connector and the second connector are fixed relative to the hub and relative to each other. As such, when the hub is rotated to the first position, the first connector is rotated into a use position while the second connector is simultaneously rotated to a non-use position. And vice versa, when the hub is rotated to the second position, the first connector is rotated into a non-use position while the second connector is simultaneously rotated to a use position.

Examples of the present disclosure include (in contrast to some conventional systems having multiple, separate adapters for different carriers) a multi-purpose adapter that selectively attaches to multiple, different connector types and that can reposition multiple of its component connectors between use and non-use positions. Among other things, examples of the present disclosure can (e.g., by moving component connectors to non-use positions) reduce the likelihood that adapters not in-use can be lost, damaged, or confused with other adapters. For example, when a first connector (e.g., for connecting to an ICS) is arranged in a use position (e.g., rotated or pivoted to the use position), a second connector is arranged in a non-use position that reduces the likelihood of the second connector interfering with the first connector or being damaged. Likewise, when the second connector (e.g., for connecting to a toddler seat) is arranged in a use position, the first connector is arranged in a non-use position that reduces the likelihood of the first connector interfering with the second connector or being damaged.

The connectors of the present disclosure can include various features. For example, the connectors can both be offset to the inside of the stroller frame, which can allow the connectors to clear the stroller frame when the adapter is rotated. In addition, one connector can be offset by a larger distance than the other connector, and as such, the connectors can accommodate carrier types and stroller accessories having corresponding connectors spaced apart by varying amounts.

In this disclosure, a stroller is described as one type of structure to which an adapter can be connected. In some examples, the adapters of the present disclosure can be connected to other types of structures, such as other perambulators, child carrier stands, child carrier swings, car seat bases, basinet frames, crib frames, and the like. In addition, the adapters can be used to connect with various types of carriers and stroller accessories, such as carry cots, infant car seats, toddler seats, trays, bumper bars (or other cross members), activity bars, and the like. Among other things, adapters that are multi-purpose and usable across different carrier types and accessories can reduce the number of parts for the system, provide convenience for the cross-product applicability between child carriers, and can be effective for reducing costs of the system.

Referring now to FIG. 1, FIG. 1 illustrates a stroller frame 110, a first child carrier 112, and a second child carrier 114. In addition, the first child carrier 112 includes a first carrier-side connector 116 (e.g., with a similar carrier-side connector on the opposing side that is obscured from view), and the second child carrier 114 includes a second carrier-side connector 118 (e.g., with a similar carrier-side connector on the opposing side that is obscured from view). In examples, the second carrier-side connector 118 is different from the first carrier-side connector 116. For example, the first carrier-side connector 116 can include, as compared to the second carrier-side connector 118, different connecting structures (e.g., male/female, slot/rail, latch/catch, etc.) and/or different relative positions (e.g., wider/narrower, higher/lower, or forward/rearward). More specifically, in FIG. 1, the first carrier-side connector 116 can include a receiver slot on the bottom side of the handle rotation hub 117, whereas the second carrier-side connector 118 can include an elongated post 119 that protrudes downwardly from the carrier 114. As depicted in FIG. 1, the first child carrier 112 can include in infant care seat (ICS), and the second child carrier 114 can include a toddler seat. These are just examples, and in other instances, the first child carrier 112 and the second child carrier 114 can include other types of carriers or stroller accessories, such as a carry cot, a tray, a bumper bar, an activity bar, and the like, which are also connectable to the stroller frame 110.

Examples of the present disclosure include a first adapter 120 and a second adapter 122 mirroring the first adapter 120 on the opposing side of the stroller frame 110. In examples, the first adapter 120 and the second adapter 122 are changeable between a first configuration for supporting the first child carrier 112 and a second configuration for supporting the second child carrier 114. For instance, FIG. 1 depicts the adapter 122 in a first configuration that is operable to connect to the first carrier-side connector 116. In addition, the adapter 122 is movable (e.g., such as by rotating or pivoting around a hub) to a second position, as depicted by "Reference View A," and in the second configuration, the adapter 122 is operable to connect to the second carrier-side connector 118. As such, examples of the present disclosure include a single, multi-purpose adapter that is operable to mate with and support multiple carrier types and/or stroller accessories having differing connection types.

FIG. 1 also illustrates other elements that can be helpful for understanding some features of the present disclosure. For example, in general, the stroller 110 (or parts of the stroller) can include various orientations, which can be defined based on a three-dimensional space, including an x-axis 124, y-axis 126, and z-axis 128. In addition, the stroller 110 generally includes a side-to-side or lateral orientation aligned in the x-axis 124, a fore-aft or forward-rearward orientation aligned in the y-axis 126, and a superior-inferior orientation aligned in the z-axis 128. These same axis, orientations, and associated planes of reference can also apply to a carrier or stroller accessory connected to the stroller frame. In addition, the stroller 110 generally includes a base 130 with wheels and includes a push handle 132 that is opposite the base (in the superior-inferior orientation). Further, the stroller 110 includes a first side frame member 134 (e.g., first side rail) on one side of the stroller 110 and includes a second side frame member 136 (e.g., second side rail) on the opposite side of the stroller 110 (in the lateral orientation). The first and second side frame members or rails 134 and 136 connect the handle 132 to the base 130.

Figure 2:
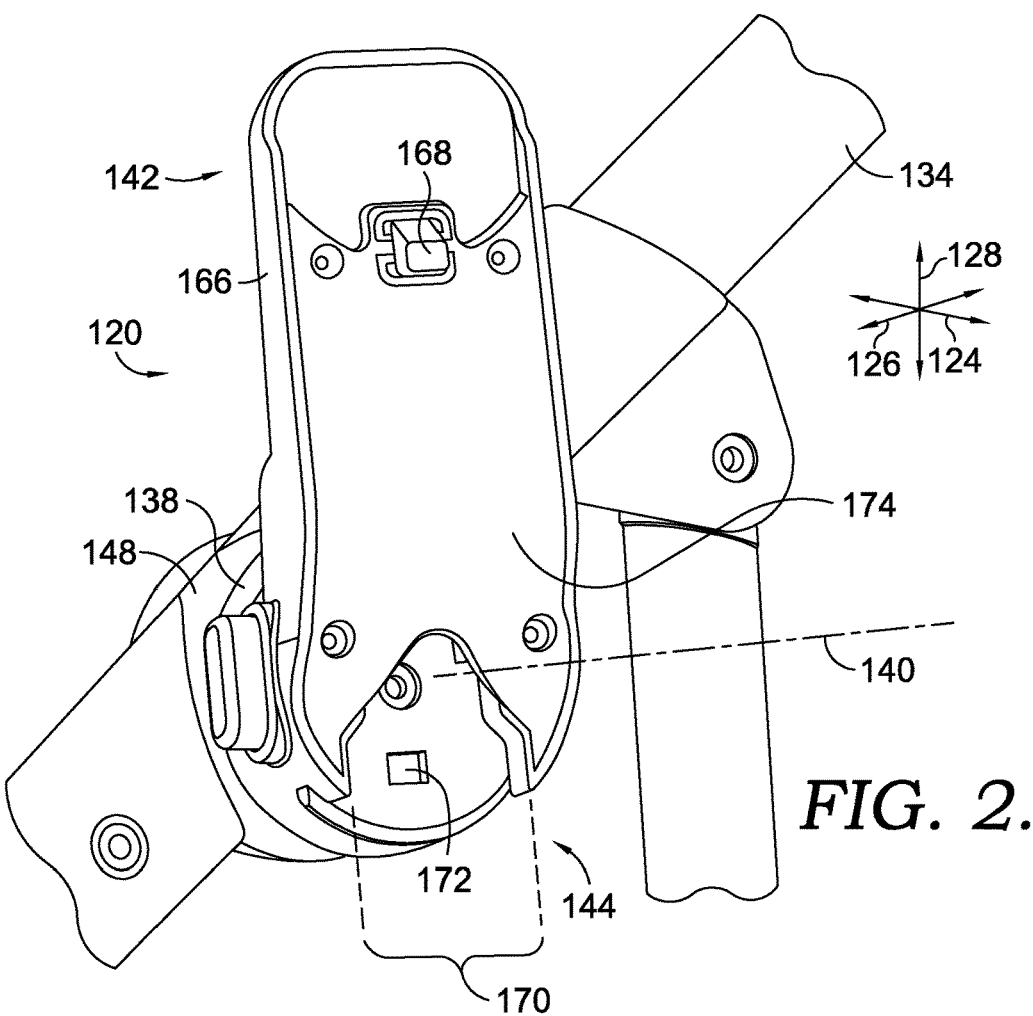
FIG. 2 depicts an enlarged view of a portion of a stroller frame and an adapter, in accordance with an example.
Figure 3:
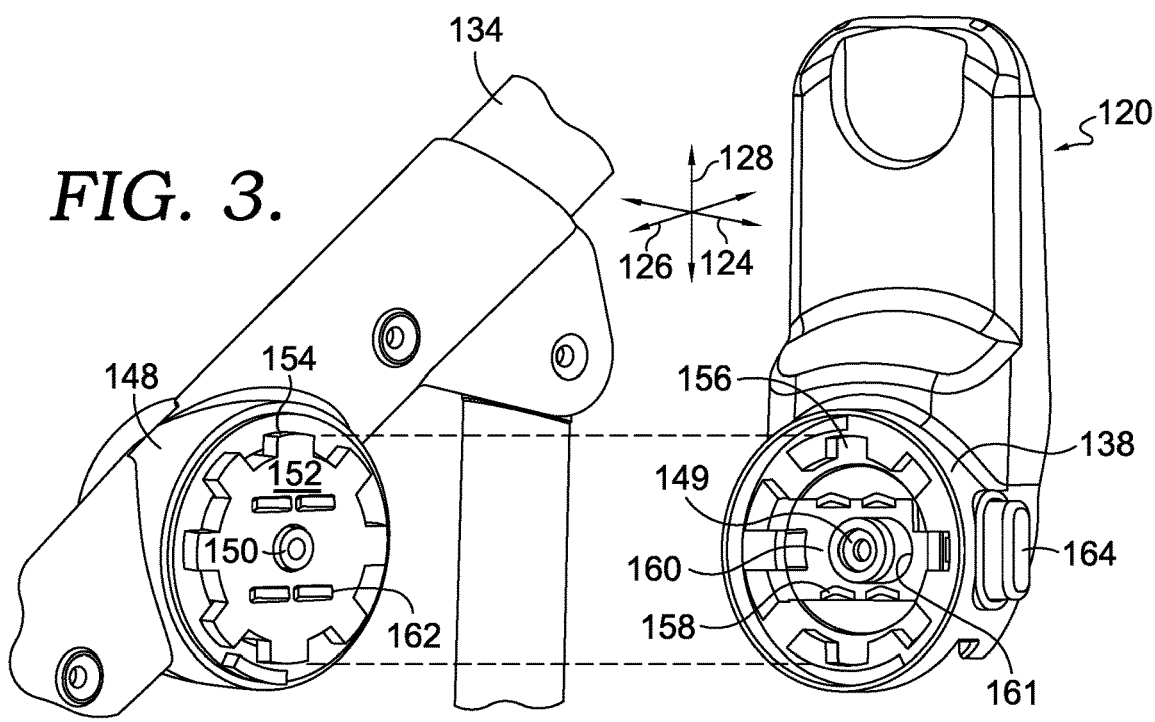
FIG. 3 depicts a partially disassembled view of a portion of a stroller frame and an adapter, in accordance with an example.

Referring now to FIGS. 2 and 3, depicted is an enlarged view of the first side frame member 134 and the adapter 120. Although not shown in FIGS. 2 and 3, the second side frame member 136 and the adapter 122 mirror the first side frame member 134 and the adapter 120, respectively, and are configured to operate in a similar manner and a similar description applies. In examples, the adapters 120 and 122 are affixed at similar positons and across from one another on the respective side rails 134 and 136. FIG. 2 depicts an assembled view, whereas FIG. 3 depicts the adapter 120 at least partially disassembled from the first side frame member 134. In examples, the adapter 120 is connected to the first side frame member 134 and is movable between different positions or configurations to mate with, and support, carriers or stroller accessories having different connector types. For example, the adapter 120 can include a hub 138 (that rotates about an axis 140), a first connector 142, and a second connector 144. When the adapter 120 is rotated to a first position (e.g., illustrated in FIG. 2 with the first connector 142 oriented upward), the first connector 142 can be used to connect to, and support, a first carrier type or stroller accessory (e.g., by connecting to a first corresponding connector on the first carrier type or stroller accessory); and when the adapter 120 is rotated to a second position (e.g., Reference View A in FIG. 1 in which the second connector 144 is rotated into an upward position), the second connector 144 can be used to connect to, and support, a second carrier type or stroller accessory (e.g., by connecting to a second corresponding connector on the first carrier type of stroller accessory). As used herein, an "upward" position can include, as compared to the other connector and when the base 130 is on a ground surface, a position that is relatively higher in the z-axis. For example, in the first position in FIG. 2, the first connector 142 is relatively higher in the z-axis 128 as compared to the second connector 144, and as such, the first connector 142 can be described as in an upward orientation or position. In addition, in some examples, the hub 138 can move, by rotating, between a first arrangement (e.g., when the adapter 120 is in the first position in which the first connector 142 is oriented to connect to a first carrier type) and a second arrangement (e.g., when the adapter 120 is in the second position in which the second connector 144 is oriented to connect to a second carrier type). In other examples, the hub can move by means other than rotation to change between the first arrangement and the second arrangement.

In examples, the adapter 120 can include the hub 138 that attaches to, and rotates relative to, a base 148 (e.g., an adapter mounting base), the base 148 being fixedly mounted to (or formed as part of) the first side frame member 134. For example, the hub 138 and the base 148 can include respective fastener openings 149 and 150 (shown in FIG. 3) that receive a fastener (not shown and that can include a bolt, screw, rivet or other post-style fastener that an connect through the fastener openings and allow the hub 138 to rotate), and the hub 138 can rotate around the fastener about the axis 140 and relative to the base 148. In examples, the axis 140 is aligned with the x-axis and extends normal to the first side frame member 134 (e.g., normal to a y-z reference plane that intersects a portion of the side frame member 134 at the intersection with the axis 140). In addition, as shown in FIG. 3, the base 148 can include a locking gear 152 (or other rotation lock) that can reciprocatingly move or adjust in a direction generally aligned with the x-axis 124 (e.g., relative to the fastener opening 150) and that is biased (e.g., via a spring or other elastic member that is on the backside of the locking gear 152 and hidden from view in FIG. 3) towards the hub 138. The locking gear 152 can include teeth 154 that correspond with and nest into recesses 156 of the hub 138, as well as corresponding recesses of the base 148 (the recesses of the base are blocked from view in FIG. 3 since the locking gear 152 in nested). As such, when the locking gear 152 is simultaneously positioned in the recesses 156 of the hub 138 and the recesses of the base 148, the locking gear 152 interferes with rotation of the hub 138 to impede the hub 138 from rotating about the axis 140.

In some examples, the adapter 120 can include a lock release that pushes the locking gear 152 towards the base 148 (e.g., pushes against the force applied by the biasing mechanism), such that the teeth 154 are no longer nested in the recesses 156 and the adapter 120 is free to rotate about the axis 140. When the teeth 154 are disengaged from the recesses 156, the adapter 120 is free to rotate about the axis 140. For instance, the adapter 120 can include one or more cams 158 (e.g., triangular-shaped protrusions in FIG. 3) that, when moved in a first direction (e.g., perpendicular to the axis 140), can push against a corresponding follower surface 162 (e.g., triangular recesses having a shape corresponding to the cams 158) of the locking gear 152 to push the locking gear 152 into the base 146 and away from the hub 138, such that the teeth 154 disengage from the recesses 156. In examples, the cams 158 can include various types of surfaces (e.g., sloped surfaces) that correspond with a surface of the follower surface 162. In addition, the cams 158 can be operated using various mechanisms. For example, the adapter 120 can include a lock release button 164 that is connected to the cams 158 and that, when depressed, can push the cams 158 in the corresponding direction (e.g., the lock release button 164 can operate as a cam actuator).

In some examples, the cams 158 are coupled to a cam carriage 160 that has an ovular recess 161, which provides a track for the cam carriage 160 to travel relative to the wall around the recess 149 and fastener, such as when the lock release button 164 is depressed. In some examples, a spring or other biasing member can be connected to the cams 158, cam carriage 160, and/or the button 164 to return the cams 158 and cam carriage 160 to a deactivated position (e.g., when the cam activator button 164 is no longer depressed). Once the cams 158 have engaged the follower surface 162 and pushed the locking gear 152 with teeth 154 out of engagement with the recesses 156, the adapter 120 (including the cams 158 and the cam carriage 160) can freely rotate in either direction about the axis 140, until the cams 158 return to their at rest position and the locking gear 152 reengages the hub 138. When the cams 158 are in a deactivated position and no longer biasing the follower surface 162 into the base 148, the locking gear 152 can move back towards the hub 138 and the teeth 154 can reengage the recesses 156 to impede adapter 122 rotation. This is merely one example of a locking mechanism that can selectively impede or allow rotation of the adapter 120, and other locking mechanisms can also be used.

In at least one example, the cams 158 and the follower surfaces 162 include a symmetrical arrangement, such that they are alignable in at least two different adapter orientations that are approximately 180 degrees opposite one another. For example, FIGS. 2 and 3 depict a first orientation in which the connector 142 is in an upward position or usable position at which a carrier or accessory can be connected. When the button 164 is depressed, the adapter 120 can be rotated to a second orientation or configuration, in which the first connector 142 is rotated downward and the second connector 144 is in the upward position for use, and based on the symmetry between the cams 158 and the follower surface 162, locking gear 152 can again lock into position in the second orientation.

The first connector 142 and the second connector 144 can include various elements. In one example, the first connector 142 and the second connector 144 include a position that is fixed relative to the hub 138, such that when the hub 138 is rotated, both the first connector 142 and the second connector 144 simultaneously rotate. In one example, at least a portion the first connector 142 and/or at least a portion of the second connector 144 is integrally formed with the hub 138. For example, a unitary shell or housing can form at least part of the hub 138 and at least part of the first connector 142 and/or second connector 144. In addition, the first connector 142 and/or the second connector 144 can include portions that are constructed as separate pieces that are fixedly connected to the hub 138, such as by a fastener or by being snapped together. In addition, based at least in part on being fixedly connected to the hub 138, the first connector 142 and the second connector 144 can include a constant position relative to one another. For example, the first connector 142 can be oriented opposite the second connector or at approximately 180 degrees relative to the second connector 144.

In additional examples, the first connector 142 and the second connector 144 can include a position relative to the first side frame member 134 and/or to the base 148. For example, referring to FIG. 4, a front view is shown of the adapter 120 and a portion of the first side frame member 134. In at least some instances, both the first connector 142 and the second connector 144 are inset (inwardly offset) in the x-axis 124 relative to the first side frame member 134 or the base 148. As such, when the hub 138 rotates about the axis 140 and relative to the first side frame member 134, the first connector 142 and the second connector 144 are clear of the first side frame member 134 and can move between configurations without interference with the first side frame member 134.

Figure 4:
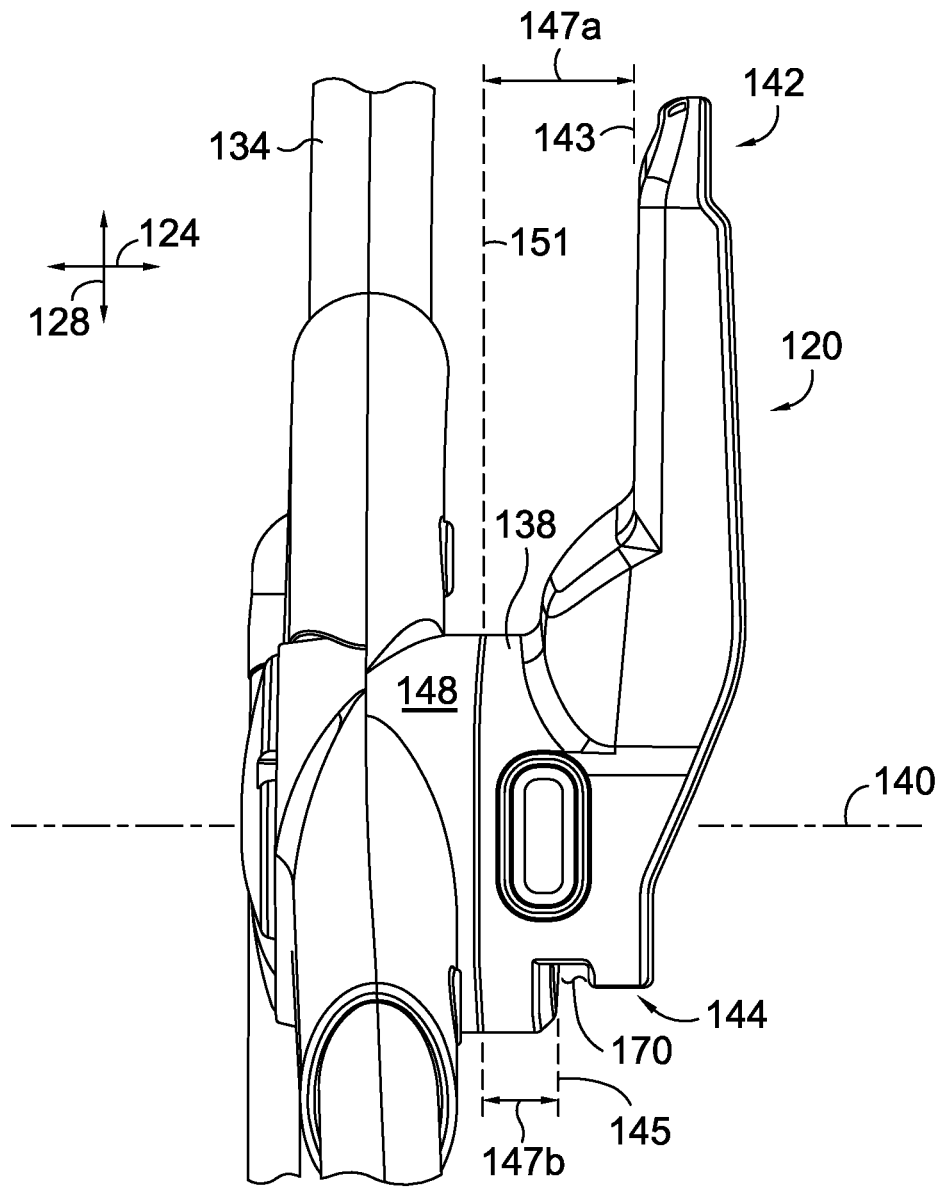
FIG. 4 depicts a front elevation view of a portion of a stroller frame and an adapter, in accordance with an example.

In at least some examples, the first connector 142 and the second connector 144 can be spaced apart from the first side frame member 134 or the base 148 in the x-axis 124 by different amounts. For example, as compared to the second connector 144, the first connector 142 can be spaced farther inward and away from the first side frame member 134 or the base 148 in order to accommodate a carrier or accessory having connectors that are spaced closer together. As compared to the first connector 142, the second connector 144 can be spaced closer to the first side frame member 134 or the base 148 in order to accommodate a carrier or accessory having connectors that are spaced farther apart. Stated differently, FIG. 4 depicts a position 151 of a z-y reference plane that is aligned with a point on the base 148 (e.g., an innermost point of the base), as well as positions 143 and 145 of z-y reference planes that are aligned with respective parts of the first connector 142 and second connector 144 (e.g., outermost parts in the x-axis). In one example, a distance 147a between the position 143 and the position 151 is longer than a distance 147b between the position 145 and the position 151. For example, the distance 147a can be greater than the distance 147b by an amount that is about the width (in the x-axis 124) of the slot 170 or is greater than the width (in the x-axis 124) of the slot 170.

In examples, the first connector 142 can include various structural elements to connect to and support a first carrier type (e.g., ICS 114) or stroller accessory (e.g., by connecting to a first corresponding connector of the first carrier type or stroller accessory). For example, referring to FIG. 2, the first connector 142 can include a body 166 that is relatively flat and broad (e.g., rectilinear in cross section) and that can be matingly received in or against a corresponding recess of the connector on the first carrier type of stroller accessory. In addition, the first connector 142 can include a protruding boss 168 that extends outwardly from the body 166 that that can operate as a catch or latch to engage a hook or recess of the corresponding connector of the first carrier type of stroller accessory. In some instances, when the body 166 is mated to a corresponding carrier-side connector, the first connector 142 can operate as a post or other support structure on which the first carrier type or stroller accessory is mounted. In some examples, the relatively flat and broad shape of the body 166 can provide a stable connection for the carrier or stroller accessory, since the interference of the body 166 nested within the recess of the carrier or stroller accessory can impede yaw-type motion around the z-axis, pitch-type motion around the x-axis, and roll-type motion around the y-axis. The shape of the body 166 depicted in the figures is an example, and in other instances, the body 166 can include other shapes that correspond with a connector (e.g., receiver slot) on a carrier or stroller accessory.

In further examples, the second connector 144 can include various structural elements to connect to and support a second carrier type or stroller accessory, which can have a different connector type than the first carrier type or stroller accessory. For instance, the second connector 144 can include a receiver slot 170 for receiving a post member of the second carrier or stroller accessory (e.g., where the post member comprises at least a portion of a second corresponding connector of the second carrier or stroller accessory). That is, a post or other support member can be removably anchored into the receiver slot 170 to secure the carrier or stroller accessory in an upright or other usable orientation. In further examples, the second connector 144 can include a recess 172 to mate with a detent or other spring-loaded latch on the carrier or stroller accessory.

Figure 5A:
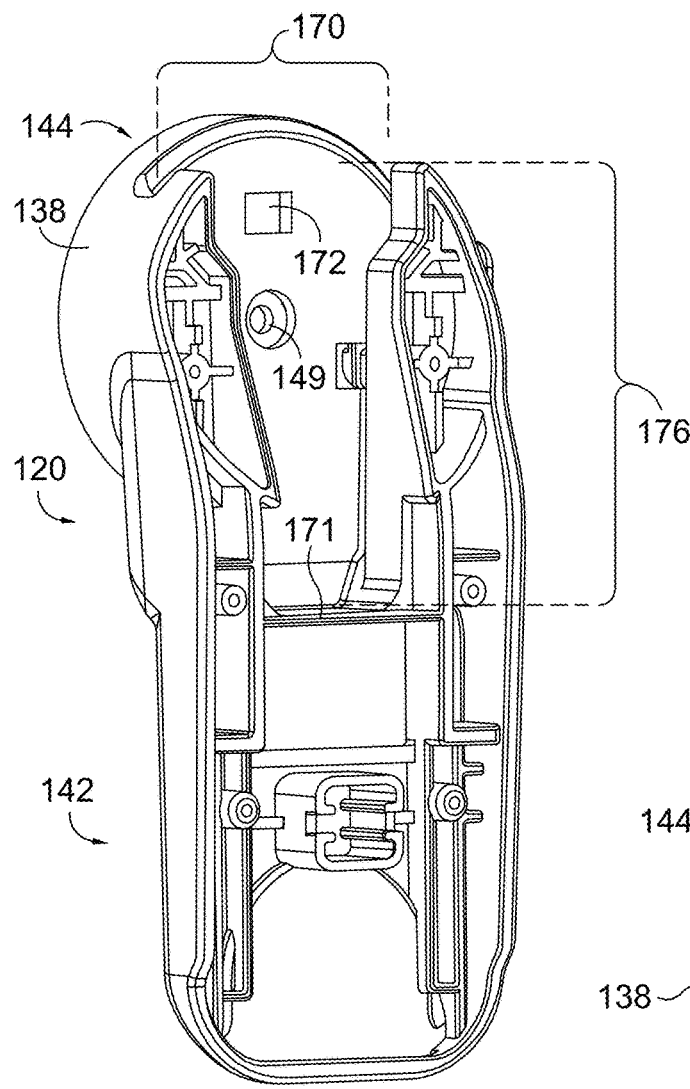
FIGS. 5A and 5B depict portions of an adapter with a portion of the adapter shell omitted, in accordance with an example.
Figure 5B:
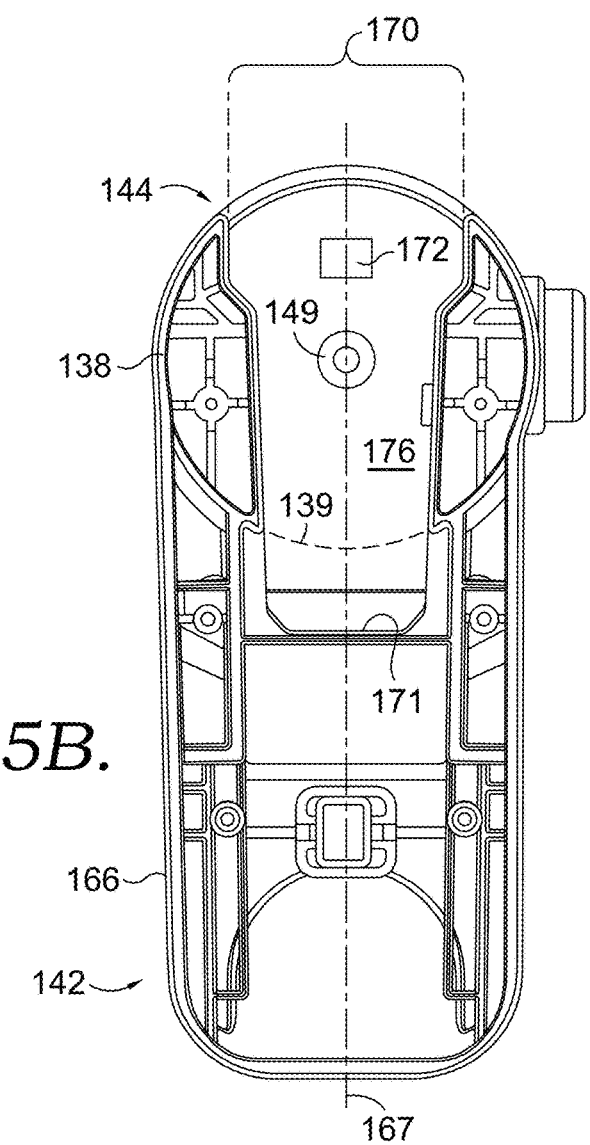

In examples, the adapter 120 can include a housing cover 174 (FIG. 2) that at least partially encloses the receiver slot 170 and that at least partially retains the carrier or accessory post in the receiver slot 170. Referring to FIG. 5A and FIG. 5B, the adapter 120 is depicted with the housing cover 174 omitted, and FIGS. 5A and 5B depicts additional portions of the receiver slot 170 and the first connector 142. In examples of the present disclosure, the receiver slot 170 is housed within at least a portion of the hub 138. For instance, a portion 176 of the slot 170 is aligned with (e.g., overlaps with) various portions of the hub 138, such as the center of the hub 138 or the fastener opening 149, and in examples, the portion 176 can extend from the slot 170 opening on one side of the hub 138 to the slot 170 terminal end 171 at the opposing side of the hub 138. In at least some examples, as depicted by FIG. 5B, the slot can include a T-shape profile, in which the top of the "T" is near the opening of the slot 170 and the stem of the "T" is formed by at least part of the portion 176 (extending from the top of the "T" to the slot terminal end 171). In examples, the T-shape can facilitate a more secure fit between the accessory connector and the second connector 144. In additional examples, the slot 170 can include portions that taper from a wider portion near the opening of the slot to a narrower portion closer to the slot terminal end 171. Among other things, the taper of the slot can help a tip of the accessory connector more easily find, slide into, and mate with the slot 170.

In examples, the slot 170 and the body 166 can be aligned along a similar axis 167 (e.g., extend along or be elongated in the direction of the axis 167) in various states of the adapter (e.g., when the first connector is configured in a use position, when the second connector is configured in the use position, and when the adapter is being rotated). That is, in FIG. 5B, the reference axis 167 is depicted for illustration purposes, and the relatively broad, flat body 166 of the first connector 142 extends outwardly from the hub 138 in the direction of the axis 167. In addition, the slot 170 includes the portion 176 that is elongated in the direction of the axis 167, and the axis 167 bisects the slot 170.

In some examples the opening of the slot 170 is on one side of the hub 138, and the terminal end 171 of the slot 170 extends (or is positioned) beyond the opposing side (e.g., as indicated by the reference line 139) of the hub 138. As such, examples of the present disclosure can efficiently use the form factor of the adapter 120 to provide a more compact, multi-connection system (e.g., by providing an adapter having a hub, first connector, and second connector all within a cohesive form factor). In addition, in some examples, when a post of the carrier or stroller accessory is secured in the receiver slot 170, at least a portion of the post extends below the axis 140, and this positioning can lower the center of gravity and provide a more stable connection (as compared to a connection that maintains the carrier or stroller accessory spaced further apart and/or above the axis 140).

In some examples, as depicted in the figures, the first connector 142 can include a post-style connector and the second connector 144 can include a slot-style connector. In some examples, both the first connector 142 and the second connector 144 can include post-style connectors. In some examples, both the first connector 142 and the second connector 144 can include slot-style connectors. In some examples, the first connector 142 and the second connector 144 can include a post, a slot, or any combination thereof.

Figure 6:
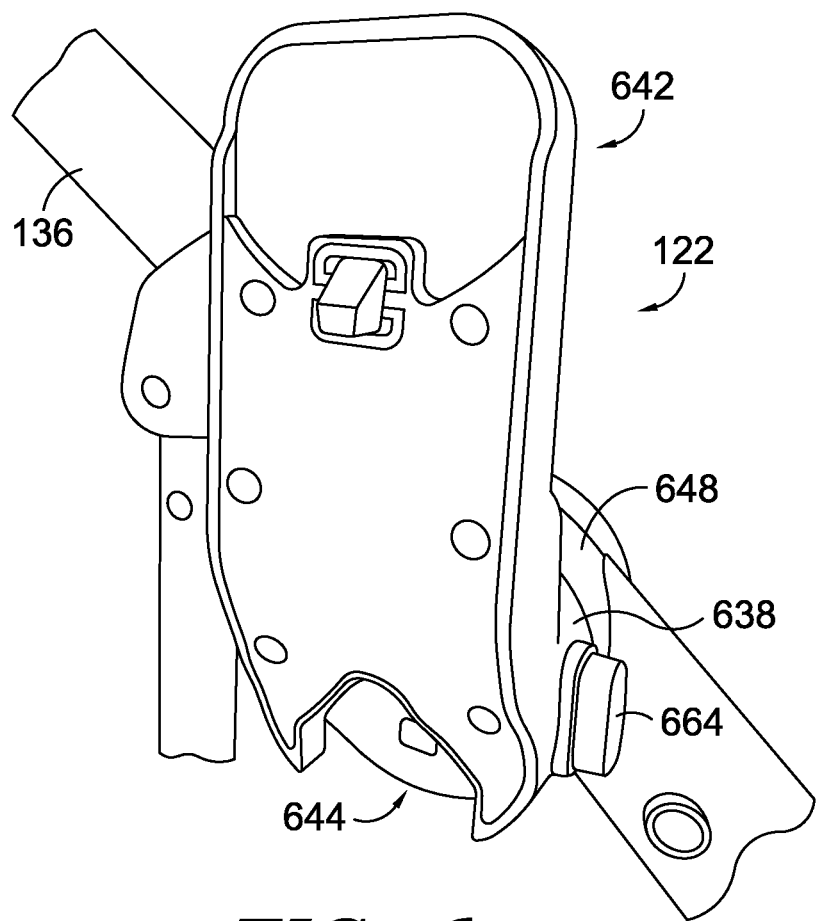
FIG. 6 depicts another adapter, in accordance with an example.

As previously indicated, the adapter 122 and the second side frame member 136 can mirror the adapter 120 and the first side frame member 134. For instance, referring to FIG. 6, the adapter 122 is depicted together with the second side frame member 136. In examples, the adapter 122 includes a third connector 642 that is similar to the first connector 142 and a fourth connector 644 that is similar to the second connector 144. In addition, the adapter 122 can include a hub 638 that rotates relative to the a base 648 (e.g., when the button 664 is depressed) to enable the adapter 122 to be changed between a first position (as depicted in FIG. 6 with the third connector 642 in an upward position) and a second position (e.g., in which the adapter 122 is rotated 180 degrees such that the fourth connector 644 is in the upward position). The other features of the adapter 120 described with respect to FIGS. 1-5A/B can also apply similarly to the adapter 122.

Figure 7:
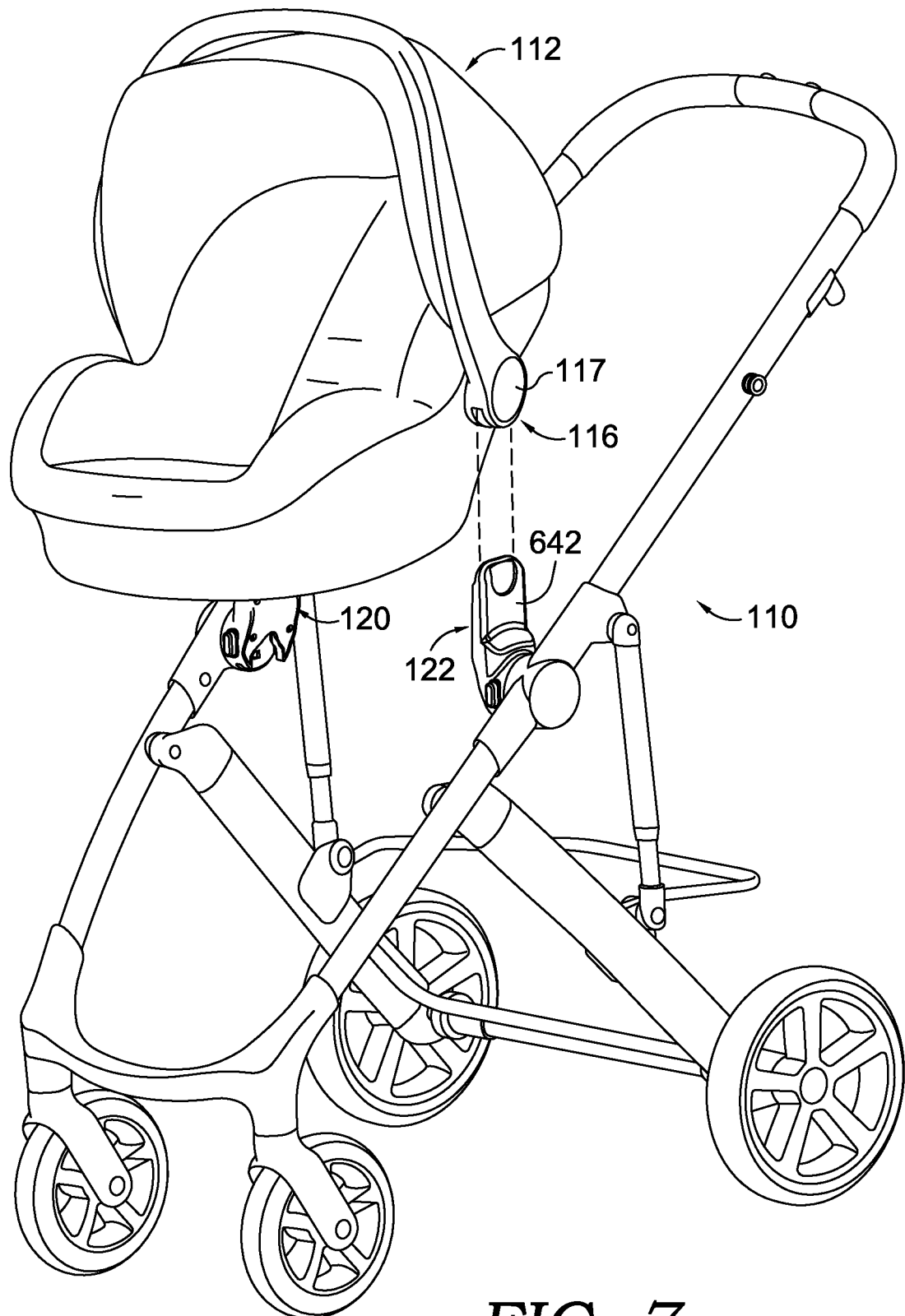
FIG. 7 depicts a stroller with adapters configured to connect to a first carrier type, in accordance with an example.

Referring to FIG. 7, FIG. 7 depicts the stroller 110 and the first carrier 112. The stroller 110 includes the adapter 122 arranged in a first position, such that the third connector 642 is oriented upward in a position configured to mate with the carrier-side connector 116 (e.g., the corresponding connector on the carrier). The stroller 110 also includes the adapter 120, which is partially obstructed from view by the first carrier 112 and that is also in a first position, similar to the adapter 122. As previously described, the third connector 642 can include a relatively flat and broad body that is shaped to insert into a recess on the bottom side of the handle rotation hub 117, and in some instances, the third connector 642 can operate as a post or similar structure for supporting the first carrier 112. In addition, the third connector 642 can include a protruding boss (e.g., 168 in FIG. 2), that can engage a latch, hook, or other connector inside the recess on the bottom side of the handle rotation hub 117. As explained, the adapters 120 and 122 are movable (e.g., rotatable) between the first position (e.g., depicted in FIG. 7) and a second position.

Figure 8:
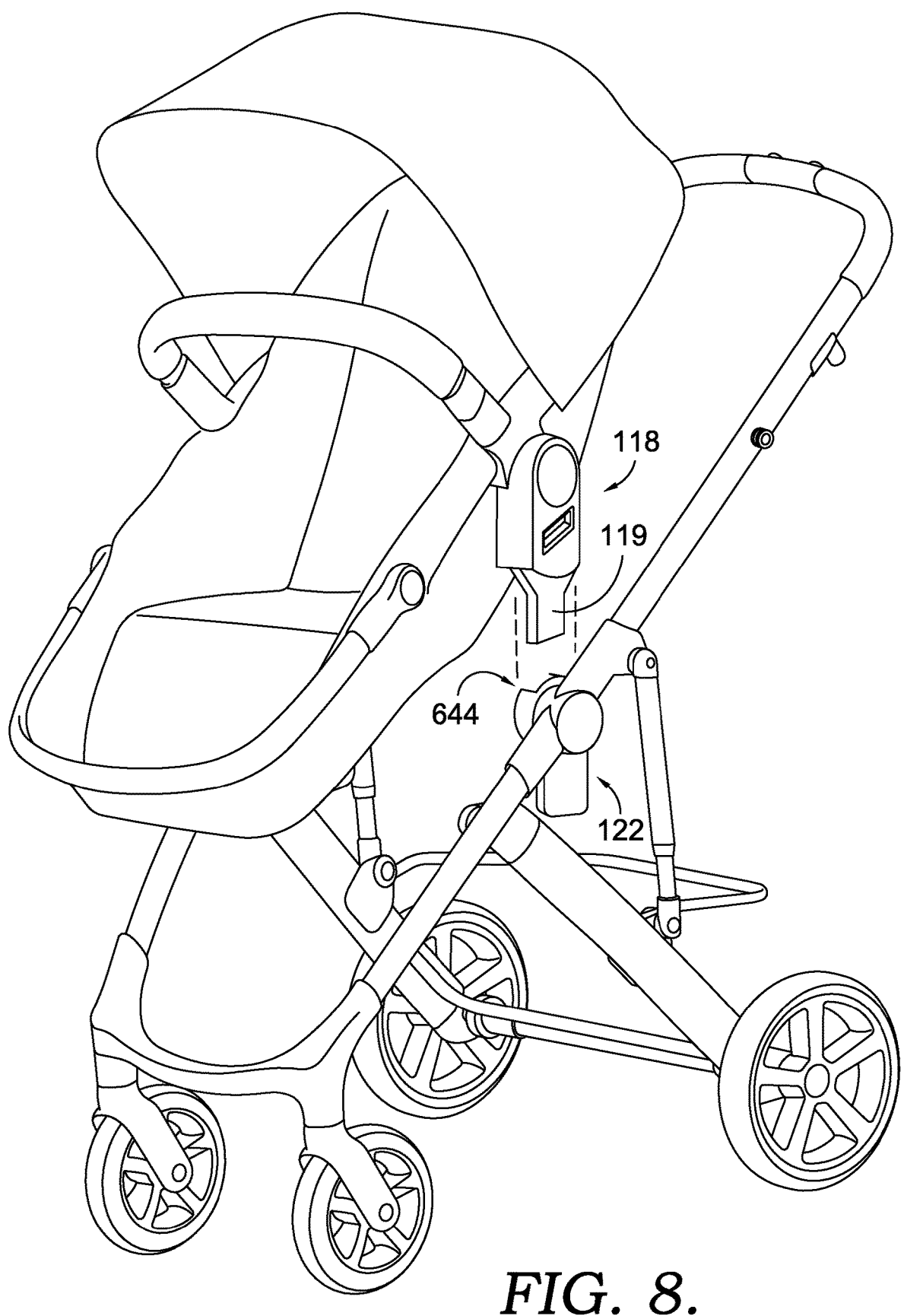
FIG. 8 depicts a stroller with adapters configured to connect to a second carrier type, in accordance with an example.

Referring now to FIG. 8, an example of the present disclosure is depicted, showing the adapter 122 (the adapter 120 being obscured from view) moved to the second position, such that the fourth connector 644 is oriented upward in a position configured to mate with the carrier-side connector 118 (e.g., the corresponding connector on the carrier). As previously described, the fourth connector 644 can include a receiver slot (e.g., 170) shaped to receive the post 119 of the carrier-side connector 118. In addition, the fourth connector 644 can include the recess (e.g., 172 in FIG. 2), that can engage a detent or other connector affixed to the post 119. As explained, the adapters 120 and 122 are movable (e.g., rotatable via the hub 138 by depressing the button 164 to release the locking gear 152) between the second position (e.g., depicted in FIG. 7) and the first position (e.g., depicted in FIG. 6) to accommodate carriers or stroller accessories with different connector types.

EXAMPLE CLAUSES

Clause A: A stroller frame comprising: a first side rail and a second side rail; a first adapter coupled to the first side rail and a second adapter coupled to the second side rail; the first adapter comprising a first hub that rotates, relative to the first side rail, about a first axis, which extends normal to the first side rail, wherein the first hub comprises: a first connector configured to mate with a first corresponding connector on a first child carrier device; and a second connector that is oriented, on the first hub, opposite the first connector and that is configured to mate with a second corresponding connector on a second child carrier device, the first connector and the second connector being fixed relative to the first hub and configured to rotate with the first hub when the first hub rotates relative to the first side rail; the second adapter comprising a second hub that rotates, relative to the second side rail, about a second axis, which extends normal to the second side rail, wherein the second hub comprises: a third connector configured to mate with a third corresponding connector on the first child carrier device; and a fourth connector that is oriented, on the second hub, opposite the third connector and that is configured to mate with a fourth corresponding connector on the second child carrier device, the third connector and the fourth connector being fixed relative to the second hub and configured to rotate with the second hub when the second hub rotates relative to the second side rail.

Clause B: The stroller frame of Clause A, wherein: the first connector and the second connector are inwardly offset from the first side rail, and the third connector and the fourth connector are inwardly offset from the second side rail.

Clause C: The stroller frame of Clause A or B, wherein: the first side rail comprises an adapter mounting base; the first hub is connected to, and rotates relative to, the adapter mounting base; the first connector is spaced apart, in an inwardly offset direction, from the adapter mounting base by a first distance; and the second connector is spaced apart, in an inwardly offset direction, from the adapter mounting base by a second distance, which is less than the first distance.

Clause D: The stroller frame of any of Clauses A, B, or C, wherein: the first connector includes a post that extends outwardly from the first hub; the second connector includes slot at least partially enclosed by a wall; and the wall comprising at least a portion of the first hub.

Clause E: The stroller frame of any of Clauses A through D, wherein: the first connector includes a broad, flat post that extends, at a first orientation, outwardly from the first hub in and that is configured to mate in a corresponding recess of the first carrier; and the second connector includes a slot that is elongated in a second orientation, which is fixed relative to the first orientation when the first connector is in a use position, the second connector is in the use position, and the first adapter transitions between the first connector being in the use position and the second connector being in the use position.

Clause F: A stroller-frame adapter comprising: a hub attached to a stroller frame and configured to rotate about an axis; a first connector at a first position on the hub and configured to connect with a first corresponding connector on a first child carrier device; and a second connector at a second position on the hub and configured to connect with a second corresponding connector on a second child carrier device, wherein the second position is different from, and fixed relative to, the first position.

Clause G: The stroller-frame adapter of Clause F, wherein the first connector and the second connector are inwardly offset from the stroller frame Clause H: The stroller-frame adapter of any of Clauses F or G, wherein: the first connector is spaced apart, in a direction, from the stroller frame by a first distance; and the second connector is spaced apart, in the direction, from the stroller frame by a second distance, which is less than the first distance.

Clause I: The stroller-frame adapter of any of Clauses F through H, wherein: the first connector includes a post that extends outwardly from the hub; and the second connector includes a slot that shares at least one wall with the hub.

Clause J: The stroller-frame adapter of any of Clauses F through I, wherein: the first connector includes a post that extends radially away from the hub and the axis; and the second connector includes a slot that intersects the axis.

Clause K: The stroller-frame adapter of any of Clauses F through J, wherein: the first connector includes a post that extends outwardly from the hub; and the second connector includes a slot comprising: a slot opening positioned at a side of the hub; and a slot terminal end that extends to at least an opposing side of the hub.

Clause L: The stroller-frame adapter of any of Clauses F through K, wherein: the hub includes a fastener opening that is coaxial with the axis; the stroller-frame adapter further comprises a cam mounted on a cam carriage and an actuator button for activating the cam and the cam carriage; the cam carriage including a slot that is aligned with the fastener opening and that provides a track along which the cam carriage is movable in a direction relative to the fastener opening when the actuator button is moved in the direction; and the cam for engaging a follower surface of a rotation lock when the cam carriage moves relative to the fastener opening.

Clause M: The stroller-frame adapter of any of Clauses F through L, wherein: the hub includes one or more recesses that correspond with a locking gear of the stroller frame; and the stroller-frame adapter further comprises a lock release button that, when activated, disengages the locking gear from the one or more recesses to permit the hub to rotate about the axis.

Clause N: A child-carrier adapter comprising: a hub configured to move between a first arrangement and a second arrangement; a first connector at a first position on the hub and configured to, when the hub is in the first arrangement, mate with a first corresponding connector on a first child carrier device; and a second connector at a second position on the hub and configured to, when the hub is in the second arrangement, mate with a second corresponding connector on a second child carrier device, wherein the second position is different from, and fixed relative to, the first position.

Clause O: The child-carrier adapter of Clause N, wherein the first connector and the second connector are configured to rotate with the hub about the axis.

Clause P: The child-carrier adapter of an of Clauses N or O, wherein: the axis extends coaxially with a fastener opening of the hub, and the first connector and the second connector include a longitudinal dimension that is radially oriented with respect to the axis.

Clause Q: The child-carrier adapter of any of Clauses N through P, wherein the first child carrier device is a toddler seat.

Clause R: The child-carrier adapter of any of Clauses N through Q, wherein first connector comprises a slot configured to receive a post of the first corresponding connector on the toddler seat.

Clause S: The child-carrier adapter of any of Clauses N through R, wherein the second child carrier device is an infant car seat.

Clause T: The child-carrier adapter of any of Clauses N through S, wherein the second connector comprises a post having a broad, flattened body, the post being configured to insert into a recess of the infant car seat.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

This detailed description is provided in order to meet statutory requirements. However, this description is not intended to limit the scope of the invention described herein. Rather, the claimed subject matter may be embodied in different ways, to include different steps, different combinations of steps, different elements, and/or different combinations of elements, similar or equivalent to those described in this disclosure, and in conjunction with other present or future technologies. The examples herein are intended in all respects to be illustrative rather than restrictive. In this sense, alternative examples or implementations can become apparent to those of ordinary skill in the art to which the present subject matter pertains without departing from the scope hereof.

Claimed is:

1. A stroller frame comprising:
a first side rail and a second side rail;
a first adapter coupled to the first side rail and a second adapter coupled to the second side rail;
the first adapter comprising a first hub that rotates, relative to the first side rail, about a first axis, which extends normal to the first side rail, wherein the first hub comprises:
a first connector configured to mate with a first corresponding connector on a first child carrier device; and
a second connector that is oriented, on the first hub, opposite the first connector and that is configured to mate with a second corresponding connector on a second child carrier device, the first connector and the second connector being fixed relative to the first hub and configured to rotate with the first hub when the first hub rotates relative to the first side rail;
the second adapter comprising a second hub that rotates, relative to the second side rail, about a second axis, which extends normal to the second side rail, wherein the second hub comprises:
a third connector configured to mate with a third corresponding connector on the first child carrier device; and
a fourth connector that is oriented, on the second hub, opposite the third connector and that is configured to mate with a fourth corresponding connector on the second child carrier device, the third connector and the fourth connector being fixed relative to the second hub and configured to rotate with the second hub when the second hub rotates relative to the second side rail.

2. The stroller frame of claim 1, wherein:
the first connector and the second connector are inwardly offset from the first side rail, and
the third connector and the fourth connector are inwardly offset from the second side rail.

3. The stroller frame of claim 1, wherein:
the first side rail comprises an adapter mounting base;
the first hub is connected to, and rotates relative to, the adapter mounting base;
the first connector is spaced apart, in an inwardly offset direction, from the adapter mounting base by a first distance; and
the second connector is spaced apart, in an inwardly offset direction, from the adapter mounting base by a second distance, which is less than the first distance.

4. The stroller frame of claim 1, wherein:
the first connector includes a post that extends outwardly from the first hub;
the second connector includes slot at least partially enclosed by a wall; and
the wall comprising at least a portion of the first hub.

5. The stroller frame of claim 1, wherein:
the first connector includes a flat post that extends, at a first orientation, outwardly from the first hub and that is configured to mate in a corresponding recess of the first carrier; and
the second connector includes a slot that is elongated in a second orientation, which is fixed relative to the first orientation when the first connector is in a use position, the second connector is in the use position, and the first adapter transitions between the first connector being in the use position and the second connector being in the use position.

6. A stroller-frame adapter comprising:
a hub attached to a stroller frame and configured to rotate about an axis;
a first connector at a first position on the hub and configured to connect with a first corresponding connector on a first child carrier device; and
a second connector at a second position on the hub and configured to connect with a second corresponding connector on a second child carrier device, wherein the second position is different from, and fixed relative to, the first position.

7. The stroller-frame adapter of claim 6, wherein the first connector and the second connector are inwardly offset from the stroller frame.

8. The stroller-frame adapter of claim 6, wherein:
the first connector is spaced apart, in a direction, from the stroller frame by a first distance; and
the second connector is spaced apart, in the direction, from the stroller frame by a second distance, which is less than the first distance.

9. The stroller-frame adapter of claim 6, wherein:
the first connector includes a post that extends outwardly from the hub; and
the second connector includes a slot that shares at least one wall with the hub.

10. The stroller-frame adapter of claim 6, wherein:
the first connector includes a post that extends radially away from the hub and the axis; and
the second connector includes a slot that intersects the axis.

11. The stroller-frame adapter of claim 6, wherein:
the first connector includes a post that extends outwardly from the hub; and
the second connector includes a slot comprising:
a slot opening positioned at a side of the hub; and
a slot terminal end that extends to at least an opposing side of the hub.

12. The stroller-frame adapter of claim 6, wherein:
the hub includes a fastener opening that is coaxial with the axis;
the stroller-frame adapter further comprises a cam mounted on a cam carriage and an actuator button for activating the cam and the cam carriage;
the cam carriage including a slot that is aligned with the fastener opening and that provides a track along which the cam carriage is movable in a direction relative to the fastener opening when the actuator button is moved in the direction; and
the cam for engaging a follower surface of a rotation lock when the cam carriage moves relative to the fastener opening.

13. The stroller-frame adapter of claim 6, wherein:
the hub includes one or more recesses that correspond with a locking gear of the stroller frame; and
the stroller-frame adapter further comprises a lock release button that, when activated, disengages the locking gear from the one or more recesses to permit the hub to rotate about the axis.

14. A child-carrier adapter comprising:
a hub configured to move between a first arrangement and a second arrangement;
a first connector at a first position on the hub and configured to, when the hub is in the first arrangement, mate with a first corresponding connector on a first child carrier device; and
a second connector at a second position on the hub and configured to, when the hub is in the second arrangement, mate with a second corresponding connector on a second child carrier device, wherein the second position is different from, and fixed relative to, the first position.

15. The child-carrier adapter of claim 14, wherein the first connector and the second connector are configured to rotate with the hub about the axis.

16. The child-carrier adapter of claim 14, wherein:
the axis extends coaxially with a fastener opening of the hub, and
the first connector and the second connector include a longitudinal dimension that is radially oriented with respect to the axis.

17. The child-carrier adapter of claim 14, wherein the first child carrier device is a toddler seat.

18. The child-carrier adapter of claim 17, wherein first connector comprises a slot configured to receive a post of the first corresponding connector on the toddler seat.

19. The child-carrier adapter of claim 18, wherein the second child carrier device is an infant car seat.

20. The child-carrier adapter of claim 19, wherein the second connector comprises a post having a flattened body, the post being configured to insert into a recess of the infant car seat.

* * * * *